United States Patent
Gordon et al.

(10) Patent No.: US 9,753,770 B2
(45) Date of Patent: Sep. 5, 2017

(54) REGISTER-TYPE-AWARE SCHEDULING OF VIRTUAL CENTRAL PROCESSING UNITS

(71) Applicant: Strato Scale Ltd., Herzlia (IL)

(72) Inventors: Abel Gordon, Haifa (IL); Shlomo Matichin, Petach Tikva (IL)

(73) Assignee: STRATO SCALE LTD., Herzliya (IL)

( * ) Notice: Subject to any disclaimer, the term of this patent is extended or adjusted under 35 U.S.C. 154(b) by 19 days.

(21) Appl. No.: 14/658,266

(22) Filed: Mar. 16, 2015

(65) Prior Publication Data

US 2015/0286501 A1    Oct. 8, 2015

Related U.S. Application Data

(60) Provisional application No. 61/974,491, filed on Apr. 3, 2014.

(51) Int. Cl.
*G06F 9/48* (2006.01)
*G06F 9/30* (2006.01)
*G06F 9/455* (2006.01)
*G06F 9/50* (2006.01)

(52) U.S. Cl.
CPC ........ *G06F 9/4881* (2013.01); *G06F 9/30098* (2013.01); *G06F 9/45533* (2013.01); *G06F 9/505* (2013.01); *G06F 9/5044* (2013.01); *G06F 2209/5019* (2013.01)

(58) Field of Classification Search
CPC .................................................... G06F 9/4881
See application file for complete search history.

(56) References Cited

U.S. PATENT DOCUMENTS

| | | | | |
|---|---|---|---|---|
| 4,809,157 | A * | 2/1989 | Eilert | G06F 9/4812 710/269 |
| 7,865,894 | B1 * | 1/2011 | Nordquist | G06F 9/5044 718/100 |
| 2003/0212880 | A1 * | 11/2003 | Luick | G06F 1/32 712/225 |
| 2008/0163206 | A1 | 7/2008 | Nair | |
| 2010/0123717 | A1 * | 5/2010 | Jiao | G06T 15/005 345/426 |
| 2011/0131571 | A1 * | 6/2011 | Heim | G06F 9/45558 718/1 |
| 2011/0219364 | A1 * | 9/2011 | Makarov | 717/151 |
| 2011/0271079 | A1 | 11/2011 | Rymarczyk et al. | |
| 2012/0084777 | A1 | 4/2012 | Jayamohan | |
| 2015/0215379 | A1 * | 7/2015 | Tamano | G06F 9/50 709/201 |

OTHER PUBLICATIONS

Jimson Mathew et al., Energy-Efficient Fault-Tolerant Systems (Embedded Systems), Sep. 7, 2013.*
Jernej Barbic, Multi-core architectures, 2006.*
International Application # PCT/IB2015/052180 Search Report dated Sep. 1, 2015.
Advanced Vector Extensions—https://en.wikipedia.org/wiki/Advanced_Vector_Extensions, 5 pages, Dec. 14, 2012.

* cited by examiner

*Primary Examiner* — Charlie Sun
(74) *Attorney, Agent, or Firm* — D.Kligler IP Services Ltd.

(57) ABSTRACT

A method includes running multiple processing tasks on multiple physical processing cores that support general-purpose registers and special-purpose registers. Respective usage levels, with which the processing tasks use the special-purpose registers, are estimated. The physical processing cores are assigned to the processing tasks based on the estimated usage levels of the special-purpose registers.

26 Claims, 2 Drawing Sheets

US 9,753,770 B2

REGISTER-TYPE-AWARE SCHEDULING OF VIRTUAL CENTRAL PROCESSING UNITS

CROSS-REFERENCE TO RELATED APPLICATIONS

This application claims the benefit of U.S. Provisional Patent Application 61/974,491, filed Apr. 3, 2014, whose disclosure is incorporated herein by reference.

FIELD OF THE INVENTION

The present invention relates generally to machine virtualization, and particularly to methods and systems for scheduling virtual central processing units (VCPUs).

SUMMARY OF THE INVENTION

An embodiment of the present invention that is described herein provides a method including running multiple processing tasks on multiple physical processing cores that support general-purpose registers and special-purpose registers. Respective usage levels, with which the processing tasks use the special-purpose registers, are estimated. The physical processing cores are assigned to the processing tasks based on the estimated usage levels of the special-purpose registers.

In some embodiments, assigning the physical processing cores includes applying a scheduling criterion that aims to reduce usage of the special-purpose registers per physical processing core. In an embodiment, the scheduling criterion aims to reduce a maximal number of the processing tasks that use the special-purpose registers on any given physical processing core. In another embodiment, the scheduling criterion aims to reduce a number of save and load operations of the special-purpose registers. In yet another embodiment, the scheduling criterion aims to reduce a number of detection operations that detect usage of the special-purpose registers.

In a disclosed embodiment, estimating the usage levels includes assigning the processing tasks respective scores that are indicative of the usage levels of the special-purpose registers, and assigning the physical processing cores includes scheduling the processing tasks for execution by the physical processing cores in accordance with the scores. In various embodiments, the special-purpose registers may include Floating-Point Unit (FPU) registers, Single-Instruction Multiple-Data (SIMD) registers and/or vector registers. In an embodiment, running the processing tasks includes running Virtual Central Processing Units (VCPUs) of Virtual Machines (VMs).

In some embodiments, the multiple physical processing cores are included in a processor. In other embodiments, the multiple physical processing cores are distributed over multiple physical hosts. In an embodiment, assigning the physical processing cores to the processing tasks includes determining, based on the estimated usage levels of the special-purpose registers, a placement of Virtual Machines (VMs) that execute the processing tasks on physical hosts that include the physical processing cores.

There is additionally provided, in accordance with an embodiment of the present invention, an apparatus including a monitoring module and a scheduling module. The monitoring module is configured to monitor multiple processing tasks that run on multiple physical processing cores that support general-purpose registers and special-purpose registers, and to estimate respective usage levels with which the processing tasks use the special-purpose registers. The scheduling module is configured to assign the physical processing cores to the processing tasks based on the estimated usage levels of the special-purpose registers.

There is further provided, in accordance with an embodiment of the present invention, a processor including multiple physical processing cores and a hypervisor. The physical processing cores support general-purpose registers and special-purpose registers. The hypervisor is configured to run multiple processing tasks on the physical processing cores, to estimate respective usage levels with which the processing tasks use the special-purpose registers, and to assign the physical processing cores to the processing tasks based on the estimated usage levels of the special-purpose registers.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for scheduling of processing tasks that potentially use both general-purpose and special-purpose registers. In some embodiments, a computer hosts one or more Virtual Machines (VMs), each comprising one or more Virtual Central Processing Units (VCPUs). A hypervisor in the computer allocates physical resources to the various VMs, and in particular assigns physical processing cores of the computer to the VCPUs.

The physical processing cores support both general-purpose registers and special-purpose registers. Special-purpose registers may comprise, for example, Floating-Point Unit (FPU) registers used for floating-point computations, Single-Instruction Multiple-Data (SIMD) registers used for SIMD operations, or vector registers used for vector computations.

In most practical scenarios, the special-purpose registers are used by relatively few software applications. If, however, VCPUs that use the special-purpose registers are assigned to the same physical processing core, context switching between them typically incurs considerable overhead. Such context switching typically involves storing the context of one VCPU (including the special-purpose registers content) in Random Access Memory (RAM), and loading the context of another VCPU (including the special-purpose registers content) from RAM.

In some embodiments, the hypervisor assigns the VCPUs to the processing cores in a manner that reduces or eliminates this overhead. Typically, the hypervisor aims to assign VCPUs that use the special-purpose registers to different physical processing cores. When total separation is not possible, the hypervisor may aim to distribute the usage of the special-purpose registers as much as possible among the physical processing cores, and thus reduce the usage of the special-purpose registers per physical processing core. Various scheduling schemes that achieve this goal are described herein.

In an embodiment, the hypervisor monitors the operation of the various VCPUs, and assigns each VCPU a score that is indicative of the level of usage of the special-purpose registers by the VCPU. In one example implementation, the score comprises a single bit, e.g., "1" for a VCPU that uses the special-purpose registers and "0" for a VCPU that does not. The hypervisor then assigns VCPUs to physical processing cores based on the scores.

The embodiments described herein refer mainly to assigning VCPUs to physical processing cores, but the disclosed techniques can be used with other types of processing tasks. For example, the methods described herein can be used by an operating system for scheduling software threads that potentially use special-purpose registers. Moreover, the processing cores need not necessarily reside in a single computer. For example, the disclosed techniques can be used as part of a placement algorithm that assigns VMs to physical hosts.

System Description

Figure 1:
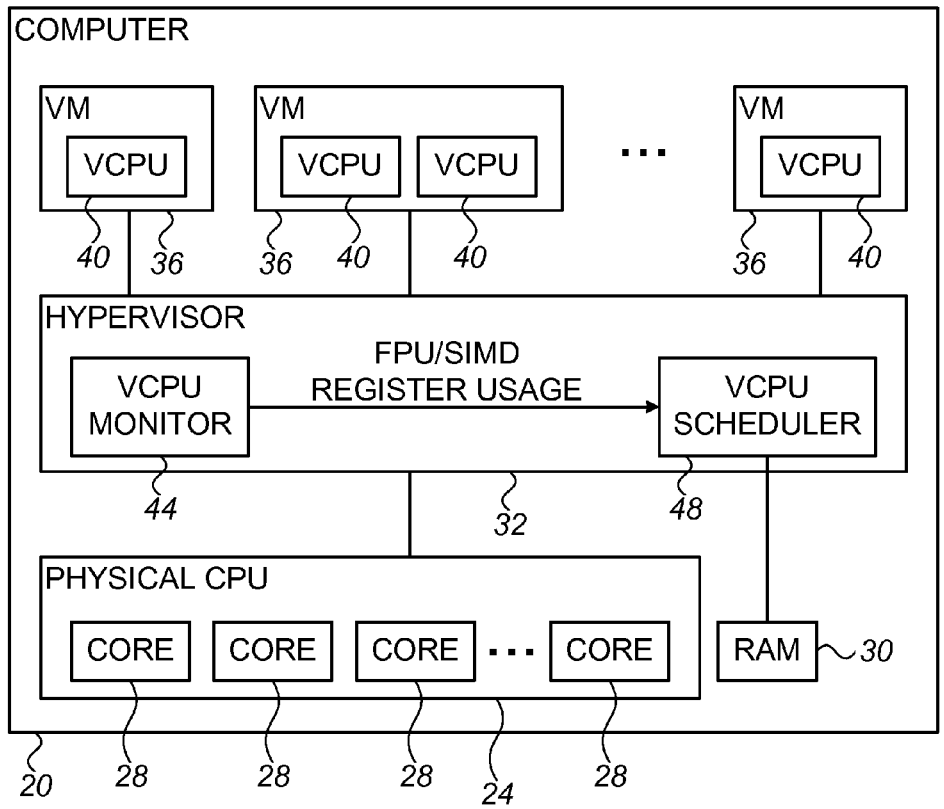
FIG. 1 is a block diagram that schematically illustrates a computer, in accordance with an embodiment of the present invention.

FIG. 1 is a block diagram that schematically illustrates a computer 20, in accordance with an embodiment of the present invention. Computer 20 comprises a Central Processing Unit (CPU) 24 that comprises multiple physical processing cores 28, and a Random Access Memory (RAM) 30. Physical processing cores 28 are also referred to herein as processing cores, or simply cores for brevity.

A hypervisor 32 allocates physical resources of computer 20 to one or more Virtual Machines (VMs) 36 hosted by the computer. Hypervisor 32 is typically implemented as a software layer running on CPU 24. The physical resources allocated by the hypervisor may comprise, for example, resources of cores 28, RAM 30, as well as network communication or persistent storage resources (not shown in the figure).

In some embodiments, each VM 36 comprises one or more Virtual CPUs (VCPUs) 40 that emulate the operation of physical CPUs. Among the various resource allocation functions, hypervisor 32 assigns physical processing cores 28 to VCPUs 40 using methods that are described in detail below. In the present example, hypervisor 32 comprises a VCPU monitoring module 44 (also referred to as VCPU monitor) and a VCPU scheduling module 48 (also referred to as VCPU scheduler). Monitoring module 44 monitors the activity of VCPUs 40, and assesses the extent to which each VCPU uses special-purpose registers (e.g., FPU, SIMD and/or vector registers). Scheduling module 48 assigns cores 28 to VCPUs 40 based on this assessment.

The various elements of computer 20 may be implemented using hardware/firmware, such as in one or more Application-Specific Integrated Circuit (ASICs) or Field-Programmable Gate Array (FPGAs). Alternatively, some computer elements, such as hypervisor 32, may be implemented in software or using a combination of hardware/firmware and software elements. In some embodiments, CPU 24 and cores 28 comprise one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Assignment of Physical Processing Cores to VCPU'S Based on Usage of Special-Purpose Registers In some embodiments, cores 28 of CPU 24 support at least two types of registers, referred to herein as general-purpose registers and special-purpose registers. The general-purpose registers are used for the majority of operation types. Typically, although not necessarily, the special-purpose registers have more bits than the general-purpose registers, and are dedicated to more complex operations.

Special-purpose registers may comprise, for example, Floating-Point Unit (FPU) registers used for floating-point computations, Single-Instruction Multiple-Data (SIMD) registers used for SIMD operations, or vector registers used for vector computations. Specific examples of special-purpose registers comprise, MMX, Streaming SIMD Extensions (SSE), SSE2, SSE3, Advanced Vector Extensions (AVX) and AVX2 registers. Alternatively, the disclosed techniques can be used with any other suitable special-purpose registers.

The general-purpose registers may comprise, for example, 32-bit or 64-bit registers. The special-purpose registers may comprise, for example, 80-bit, 128-bit, 256-bit registers or 512-bit registers. The register sizes above are given purely by way of example, and any other suitable register sizes can be used in alternative embodiments.

In most practical scenarios, the special-purpose registers are used by relatively few software applications. Nevertheless, in some cases different VCPUs 40 that use special-purpose registers may be assigned to the same core 28. In such a case, VCPU scheduler 48 of hypervisor 32 assigns core 28 to the VCPUs in alternation, by periodically context switching between the VCPUs.

In each context switching operation, scheduler 48 typically suspends the currently-executing VCPU, stores the context of that VCPU (including the special-purpose registers content) in RAM 30, loads the context of another VCPU (including the special-purpose registers content) from the RAM, and resumes execution of the new VCPU. The context switching operation incurs considerable overhead, at partly due to the large size of the registers.

In some embodiments, VCPU scheduler 48 assigns VCPUs 40 to cores 28 in a manner that reduces or eliminates this overhead. In these embodiments, VCPU monitor 44 estimates the usage levels with which the various VCPUs 40 use the special-purpose registers, and VCPU scheduler 48 assigns cores 28 to VCPUs 40 based on the estimated usage levels of the special-purpose registers.

Typically, scheduler 48 aims to assign VCPUs that use the special-purpose registers to different cores. More generally, the scheduler may aim to distribute the usage of the special-purpose registers as much as possible among cores 28, and thus reduce the usage of the special-purpose registers per core.

With this sort of assignment, the extent of competition among VCPUs for special-purpose registers is reduced. This assignment also reduces the number of load/save operations of special-purpose registers, and the number of traps (context switches between the hypervisor and the VM guest operating system for detecting usage of special-purpose registers and load/save them on-demand). Consequently, the scheduling efficiency achieved by hypervisor 32 is improved.

In various embodiments, scheduler 48 may apply various suitable scheduling criteria in order to reduce load/save operations of the special-purpose registers per core 28. In one embodiment, the scheduling criterion aims to reduce the maximal number of different VCPUs 40 that use the special-purpose registers on any given core 28. In another embodiment, the scheduling criterion aims to reduce the rate of context-switching operations between VCPUs that use the special-purpose registers.

In some embodiments, VCPU monitor 44 monitors the operation of the various VCPUs 40, and assigns each VCPU a score that is indicative of the level of usage of the special-purpose registers by that VCPU. VCPU scheduler 48 assigns VCPUs 40 to cores 28 based on the scores. For example, the scheduler may aim to minimize the maximal sum of the scores of the VCPUs assigned to any given core 28.

Monitor 44 and scheduler 48 may use any suitable type of scores to indicate the level of usage of the special-purpose registers. In one embodiment, the score comprises a single bit, e.g., "1" for a VCPU that uses the special-purpose registers and "0" for a VCPU that does not. An alternative convention may assign a score of "1" to VCPUs that make extensive use of the special-purpose registers, and "0" to VCPUs that use the special-purpose registers scarcely or not at all. Higher precision scores, which also quantify the extent to which each VCPU uses the special-purpose registers, can also be used.

Figure 2:
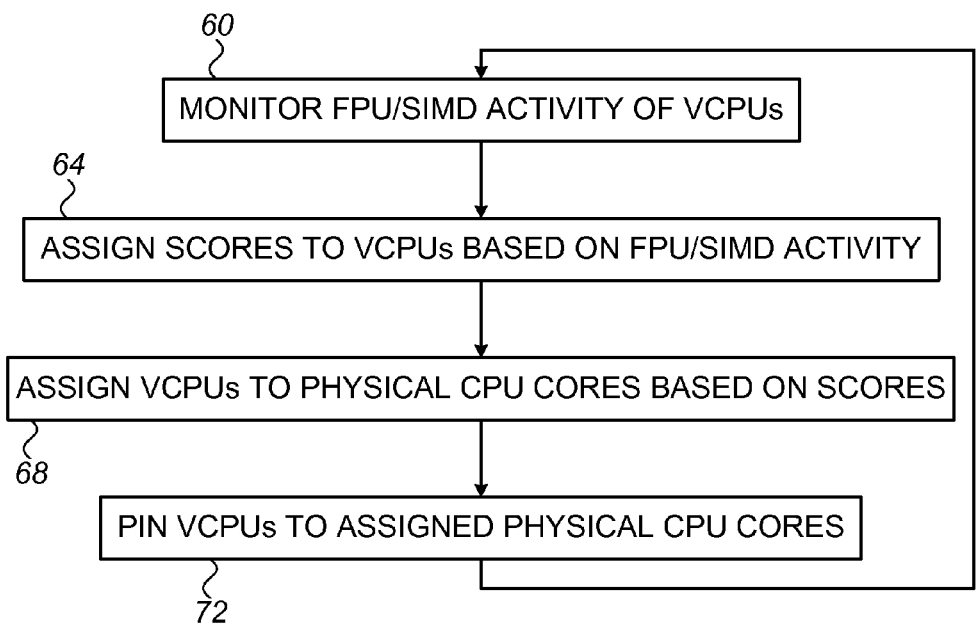
FIG. 2 is a flow chart that schematically illustrates a method for assigning VCPUs to physical CPU cores, in accordance with an embodiment of the present invention.

FIG. 2 is a flow chart that schematically illustrates a method for assigning VCPUs 40 to physical CPU cores 28, in accordance with an embodiment of the present invention. The method begins at a monitoring step 60, with VCPU monitor 44 monitoring the activity of VCPUs 40, and in particular the activity relating to usage of special-purpose registers. Monitor 44 assigns the VCPUs respective scores depending on their level of usage of the special-purpose registers, at a scoring step 64. Monitor 44 reports the scores to VCPU scheduler 48.

At a scheduling step 68, VCPU scheduler 48 assigns VCPUs 40 to cores 28 based on the scores. At a pinning step 72, scheduler 48 pins each VCPU 40 to its assigned core 28. The method loops back to step 60, so as to continue monitoring the VCPU activity. Upon detecting a change in VCPU activity, monitor 44 may adapt one or more of the scores, and this adaptation may cause scheduler 48 to adapt the assignment of VCPUs 40 to cores 28.

VM Placement Based on Usage of Special-Purpose Registers

In some embodiments, the scheduling schemes described herein can be used for implementing (or integrated with) a placement process that decides how to assign VMs to physical hosts in a computer system that comprises multiple hosts connected by a network. By using the disclosed techniques, VMs that make intensive use of special-purpose registers can be placed on different hosts, so as to improve the overall system performance. Such a placement process may be carried out by one or more of the CPUs of computers 20, or by some other suitable processor.

In these embodiments, a computer system comprises multiple computers such as computer 20 of FIG. 1. Each computer 20, also referred to as a host or physical host, runs a respective hypervisor 32. Each hypervisor 32 hosts one or more VMs 36 that each comprise one or more VCPUs 40. The computer system runs a placement process, which decides how to assign VMs 36 to hosts 20. The term "placement" refers to both initial provisioning of VMs, and live migration of operational VMs from one host to another.

Figure 3:
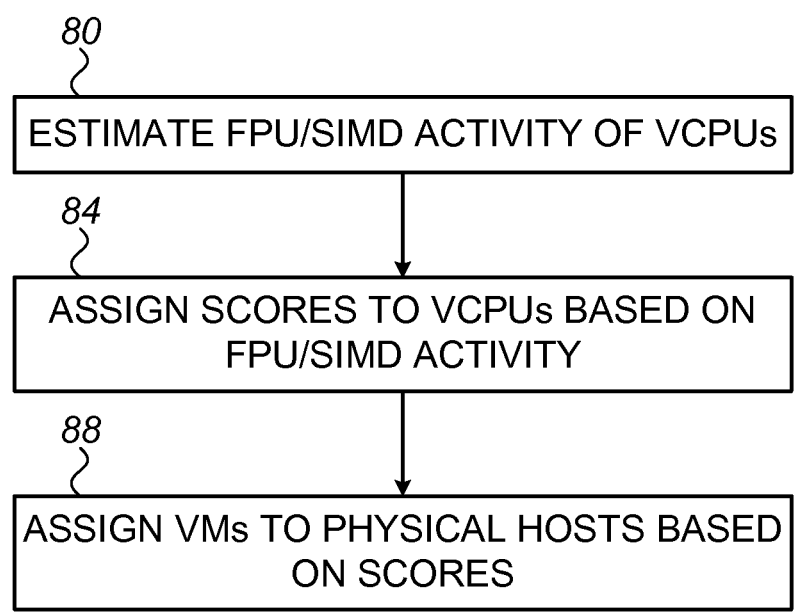
FIG. 3 is a flow chart that schematically illustrates a method for Virtual Machine (VM) placement, in accordance with an embodiment of the present invention.

FIG. 3 is a flow chart that schematically illustrates a method for VM placement, in accordance with an embodiment of the present invention. The method begins with hypervisors 32 of the various computers 20 estimating the extent of activity relating to usage of special-purpose registers, at an activity estimation step 80. Hypervisors 32 assign the VCPUs respective scores depending on their level of usage of the special-purpose registers, at a score assignment step 84.

At a placement step 88, the placement process assigns VMs 36 to physical hosts 20 based on the scores. Typically, the assignment aims to reduce or minimize the aggregate score per host. The aggregate score of a given host may be defined, for example, as the sum of the scores of the VCPUs of all VMs assigned to the host.

In order to initially place a VM using the disclosed techniques (as opposed to VM migration), the placement process typically uses prior information regarding the usage of the special-purpose registers by the VM. For example, such information may be stored in persistent storage from a past activation of the VM.

As another example, the VM in question may be a clone of another VM for which the usage of special-purpose registers is known. The placement process may assume that the usage of the two VMs is similar. As yet another example, the VM in question may use the same image as another VM for which the usage of special-purpose registers is known. In this case, too, the placement process may assume that the usage of the two VMs is similar.

Otherwise, the placement process may initially place the VM in a host in which the usage of special-purpose registers is low. This example demonstrates how placement of a VM is affected by usage of special-purpose registers by other VMs.

Additional Embodiments and Variations

In some embodiments, the scheduling criteria used by scheduler 48 may take additional factors into consideration. Additional factors may comprise, for example, performance constraints or limitations of cores 28, priorities among VMs 36, or any other suitable factor.

For a given VCPU 40, scheduler 48 may suggest several candidate cores 28 that can be assigned to that VCPU, not necessarily a single core.

The embodiments described herein refer mainly to assigning VCPUs to physical processing cores, but the disclosed techniques can be used with other types of processing tasks. For example, the methods described herein can be used by an operating system (e.g., a "bare-metal" operating system or a guest operating-system of a VM), for scheduling software threads that potentially use special-purpose registers.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
running multiple processing tasks on multiple physical processing cores in a processor that support general-purpose registers and special-purpose registers;
estimating respective usage levels with which the multiple processing tasks use the special-purpose registers;
in response to the estimating the respective usage levels, assigning the multiple processing tasks respective scores that are indicative of the respective usage levels of the special-purpose registers by the multiple processing tasks;
in response to the assigning the multiple processing tasks the respective scores, aggregating the respective scores of the multiple processing tasks on the multiple physical processing cores to obtain sums of the respective scores of the multiple processing tasks on the multiple physical processing cores; and
assigning the multiple physical processing cores to the multiple processing tasks based on the estimated usage levels of the special-purpose registers using a scheduling criterion minimizing the sums of the respective scores of the multiple processing tasks on the multiple physical processing cores to reduce a rate of context-switching between the multiple processing tasks that use the special-purpose registers.

2. The method according to claim 1, wherein the scheduling criterion aims to reduce usages of the special-purpose registers per physical processing core from the multiple physical processing cores.

3. The method according to claim 2, wherein the scheduling criterion aims to reduce a maximal number of the multiple processing tasks that use the special-purpose registers on any given physical processing core from the multiple processing cores.

4. The method according to claim 2, wherein the scheduling criterion aims to reduce a number of save and load operations of the special-purpose registers.

5. The method according to claim 2, wherein the scheduling criterion aims to reduce a number of detection operations that detect the usages of the special-purpose registers.

6. The method according to claim 1, wherein the special-purpose registers comprise Floating-Point Unit (FPU) registers.

7. The method according to claim 1, wherein the special-purpose registers comprise Single-Instruction Multiple-Data (SIMD) registers.

8. The method according to claim 1, wherein the special-purpose registers comprise vector registers.

9. The method according to claim 1, wherein the estimating the respective usage levels with which the multiple processing tasks use the special-purpose registers comprises estimating respective usage levels with which Virtual Central Processing Units (VCPUs) of Virtual Machines (VMs) use the special-purpose registers.

10. The method according to claim 1, wherein the multiple physical processing cores are distributed over multiple physical hosts.

11. The method according to claim 1, wherein the assigning the multiple physical processing cores to the multiple processing tasks comprises determining, based on the estimated usage levels of the special-purpose registers, a placement of Virtual Machines (VMs) that execute the multiple processing tasks on physical hosts that comprise the multiple physical processing cores.

12. The method according to claim 1, wherein the running the multiple processing tasks comprises running a hypervisor that allocates resources of the multiple physical processing cores to the multiple processing tasks, and wherein the estimating the usage levels of the special-purpose registers comprises monitoring the allocated resources using the hypervisor.

13. The method according to claim 1, wherein the estimating the respective usage levels with which the multiple processing tasks use the special-purpose registers comprises estimating based on monitoring the respective usage levels of the special-purpose registers in past activities of the multiple processing tasks.

14. The method according to claim 1, wherein the assigning the multiple processing tasks the respective scores comprises assigning a first score value to processing tasks that had a high level of use of the special-purpose registers and a second score value to processing tasks that had a low level of use of the special-purpose registers.

15. The method according to claim 1, wherein the assigning the multiple processing tasks the respective scores comprises assigning scores from a value scale including at least three different values.

16. An apparatus, comprising:
a memory; and
a processor, which comprises multiple physical processing cores that support general-purpose registers and special-purpose registers, and which is configured to:
monitor multiple processing tasks that run on the multiple physical processing cores;
estimate respective usage levels with which the multiple processing tasks use the special-purpose registers;
assign the multiple processing tasks respective scores that are indicative of the usage levels of the special-purpose registers by the multiple processing tasks in response to the estimating the respective usage levels;
in response to the assigning the processing tasks the respective scores, aggregate the scores of the multiple processing tasks on the multiple physical processing cores to obtain sums of the respective scores of the multiple processing tasks on the multiple physical processing cores; and
assign the multiple physical processing cores to the multiple processing tasks based on the estimated usage levels of the special-purpose registers using a scheduling criterion minimizing the sums of the respective scores of the multiple processing tasks on the multiple physical processing cores to reduce a rate of context-switching between the multiple processing tasks that use the special-purpose registers.

17. The apparatus according to claim 16, wherein the scheduling criterion aims to reduce usages of the special-purpose registers per physical processing core.

18. The apparatus according to claim 17, wherein the scheduling criterion aims to reduce a maximal number of the multiple processing tasks that use the special-purpose registers on any given physical processing core from the multiple physical processing cores.

19. The apparatus according to claim 17, wherein the scheduling criterion aims to reduce a number of save and load operations of the special-purpose registers.

20. The apparatus according to claim 17, wherein the scheduling criterion aims to reduce a number of detection operations that detect the usages of the special-purpose registers.

21. The apparatus according to claim 16, wherein the special-purpose registers comprise Floating-Point Unit (FPU) registers.

22. The apparatus according to claim 16, wherein the special-purpose registers comprise Single-Instruction Multiple-Data (SIMD) registers.

23. The apparatus according to claim 16, wherein the special-purpose registers comprise vector registers.

24. The apparatus according to claim 16, wherein the multiple processing tasks comprise Virtual Central Processing Units (VCPUs) of Virtual Machines (VMs).

25. The apparatus according to claim 16, wherein the multiple physical processing cores are distributed over multiple physical hosts.

26. The apparatus according to claim 16, wherein the processor is configured to run a hypervisor that allocates resources of the multiple physical processing cores to the multiple processing tasks, and to estimate the usage levels of the special-purpose registers by monitoring the allocated resources using the hypervisor.

\* \* \* \* \*